United States Patent [19]
Kim

[11] Patent Number: 5,560,350
[45] Date of Patent: Oct. 1, 1996

[54] HIGH EFFICIENCY, FORCED HOT AIR HEATER WHICH HUMIDIFIES AND CLEANS THE AIR

[76] Inventor: Dae Sik Kim, 49 Floral St., Newton, Mass. 02161

[21] Appl. No.: 336,912

[22] Filed: Nov. 10, 1994

[51] Int. Cl.⁶ .................................................. F24F 3/14
[52] U.S. Cl. .................... 126/113; 126/99 R; 126/110 A; 126/116 R; 237/53; 165/7
[58] Field of Search ................................ 126/113, 99 R, 126/110 R, 110 A, 116 R; 237/53; 165/7

[56] References Cited

U.S. PATENT DOCUMENTS

| | | | |
|---|---|---|---|
| 4,331,198 | 5/1982 | Michalaska et al. | 165/9 |
| 4,967,726 | 11/1990 | Finch | 126/110 R X |
| 5,184,600 | 2/1993 | Astle, Jr. | 126/113 |

*Primary Examiner*—Larry Jones
*Attorney, Agent, or Firm*—Brian M. Dingman

[57] ABSTRACT

A compact, non-polluting, extremely energy-efficient, through-the-wall vented forced hot air heater, which humidifies and cleans said hot air without any additional equipment or water supply, comprises a rotating cylindrical heat and moisture transport/storage element which has many substantially identical axially parallel flow passages and very large transfer surface per mass, a means for controllably transferring the heat and the moisture from the combustion products to said rotating element and then to said hot air stream counter-currently, and a means for preventing formation of air pollutants.

7 Claims, 2 Drawing Sheets

HIGH EFFICIENCY, FORCED HOT AIR HEATER WHICH HUMIDIFIES AND CLEANS THE AIR

BACKGROUND OF THE INVENTION

1. Field of Invention

The present invention relates to a through-the-wall vented forced hot air heater which humidifies and cleans the air without any additional equipment or a water supply and in particular to a counter-current heat and mass transfer device with a ceramic heat and moisture storage and transfer means.

2. Description of the Prior Art

Prior art vented, forced hot air space heaters have a distinct separation of the combustion side from the hot air side. Heat is transferred from the combustion process and the resulting combustion products to the forced air through the walls of a metal containment vessel and its extensions. Thus, the forced hot air temperature is limited to, and generally far below, the service temperature of the metal, which is usually a steel sheet or cast iron. Also these metals offer a limited geometry and surface area for the heat transfer.

In prior art, the exhaust temperature must be sufficiently high to prevent the condensation of the corrosive moisture and to maintain the draft in a flue. Thus a substantial portion, over twenty percent, of the available heat is lost as the sensible and the latent heat of the high temperature exhaust gas. In more recent "energy efficient" heaters, a part of the exhaust heat is recovered by transferring it counter-currently to the incoming combustion air stream.

In prior art industrial processes with high exhaust temperature, a large part of the sensible heat of the exhaust is recovered with a heat recuperator. For space heaters, however, it is neither economical nor practical because of its size and of the pollutants and the relatively low temperature of their exhaust.

Furthermore, in prior art heaters, an accurate control of the combustion process is difficult as the combustion is carried out in a chamber which is surrounded by cooler metal walls, which tend to quench the flame. This causes high levels of harmful CO and other incomplete combustion products, which are discharged via a chimney and pollute the air.

In meeting the requirements of the Clean Air Act Amendment of 1990, a significant improvement of the ambient air quality can be achieved by reducing or preventing the air pollution from the space heaters in winter, especially in the populated northeastern part of this country. An elimination of chimneys from new constructions of homes and factories in the non-attainment areas can prevent the air pollution, improve the ambient air quality and promote more efficient uses of fossil fuels for the space heating. Many advanced emission control technologies, which are developed in auto and other industries during the last two decades, are available for the space heating.

Among the various types of residential heaters, forced hot air heaters are particularly convenient for the humidification of the air, but these require a separate humidifier with its own water supply. Recently, smaller, more thermally efficient through-the-wall vented hot air heaters became popular for renovated apartments. These units eliminate the expensive duct-work and the chimney, allow a separate zone control, and give some savings in the construction and fuel costs. Also with the increasing awareness of indoor air quality, the removal of the indoor air-borne organic contaminants is a necessity, especially for those who are sensitive or allergic to these indoor pollutants. The filters are only marginally effective and the electronic types cost more than the heaters.

DISCLOSURE OF INVENTION

The present invention provides efficient means for 1) burning hydrogen containing gaseous or liquid fuel, such as natural gas, propane or middle distillate, 2) transferring the heat and a portion of the moisture from the exhaust gas to a rotating cylindrical ceramic heat and mass storage/transport element which has multiple of substantially identical axially parallel flow passages with large surface areas for heat transfer and pores for moisture condensation, 3) transporting the heat and the moisture in the form of the sensible heat of the ceramic and the condensed water, respectively, from the exhaust side to the hot air side, 4) transferring the heat and the moisture to a forced air stream and 5) incinerating any air-borne organic contaminants in the hot air stream.

Unlike prior art uses of ceramic thermal recuperators which have uniform compositions and are intended purely for thermal storage, this invention relies on a ceramic element with a controlled porosity and composition along the flow passages for transfer/storage of heat and moisture as well. Also the surface area for the heat transfer per unit mass of the ceramic is much larger than that of a conventional heat recuperator so that the temperature difference between the ceramic and the gas which is in contact becomes very small and their axial temperature profiles along the flow become similar in their shapes.

Axially, the hot end, especially with an optional oxidation catalyst, should withstand extremely hot combustion of air/fuel mixture, complete the combustion of any incomplete combustion products in the exhaust stream and burn any air-borne organic contaminants in the hot air stream. The cool end stays at near the room temperature, condenses, holds, and carries the moisture to the forced air side for humidifying the hot air stream as this rotating ceramic element travels through two adjoining functionally divided radial spaces.

In the exhaust side, a burner provides gaseous combustion product with a slight excess air to a preset radial segment of the ceramic unit. The exhaust is sucked through the flow passages by an exhaust blower. Any incompletely combusted mixture entering the hot end is oxidized completely and the heat is transferred to the ceramic walls. The transferring heat raises the temperature of the ceramic walls and the temperature of the exhaust gas progressively drops as it travels along the passage toward the cooler end. The typical operating axial temperature profiles of both the ceramic and the exhaust are flat at the both hot and cool ends and a sharp drop in the middle as shown in FIG. 2. For a detailed theoretical analysis of the transient heat transfer process between the air and solid with a large surface to mass ratio, you are referred to my doctoral dissertation, "Fluid-Particle Heat Transfer", at the Ohio State University, in 1965. When the exhaust gas reaches its dew point, the moisture condenses on the porous ceramic walls and is held by capillary action. The condensing water transfers an additional latent heat to the ceramic and causes a distortion of the temperature profile near the cool end. When the pore volume is large, almost all moisture which is produced by the combustion is condensed and transported to the hot air side except the moisture which is vented within the saturated exhaust.

In the air side, the blower forces the room air through the remaining segment of the ceramic from the cool end to the hot end, in the opposite direction of the exhaust (or counter-currently). The air entering the cool end picks up both the moisture and the sensible heat from the ceramic and raises its temperature as it travels toward the hot end. The air leaving the hot end is almost as hot as the ceramic at the hot end or close to the temperature of the combustion gas. This hot air is clean, much hotter than what is attainable in a sheet metal heater and can be used for cooking. The hot end can burn and destroy any air-borne organic contaminants completely. The axial temperature profile of the hot air is similar to that of the ceramic or the exhaust.

In this invention, the heater becomes extremely compact, less than one quarter of the size of a conventional heater with the same BTU rating because many commercially available ceramic elements, such as Celcor by Corning, Inc., can easily provide more than one thousand square feet of the heat transfer area per cubic feet. With this large surface area, a simple increase of the rotational speed of the ceramic element can easily raise the BTU rating of the heater. In addition to this operational flexibility, the partition of the ceramic for the air and the exhaust allows more design flexibilities but the best practical choice for a near stochiometric combustion of petroleum based fuels with a small amount of exhaust gas recirculation (EGR) is to use two equal halves for each side.

In this invention, as a differential radial element of the ceramic cylinder moves across the burner, the flat high temperature zone within that element is extended and the temperature profile is shifted toward the cool end. The extent of the shift corresponds to the amount of heat stored in the unit. In the air side, the profile shift toward the hot side. At a very slow rotation, the ceramic accumulates too much heat to maintain a flat temperature profile at the cool end (near the room temperature). This is called "breakthrough". At any speed, unless exactly the same amount of heat and moisture are stored and removed per rotation, they will either accumulate or be depleted and a breakthrough will result in either the hot exhaust gas or the not-hot-enough air. The stable temperature profiles are essential to a proper operation of this invention.

Although the breakthrough of the exhaust gas temperature, by slowing the rotation, can be used to control the amount of moisture to the hot air, this causes unacceptable heat loss. The amount can be controlled more efficiently by controlling the extent of the cool end of the ceramic wall which has a limited porosity. A faster rotation will store less heat per pass but provides more area for moisture and thus transports more moisture. Any excess water is blown out with the exhaust or drained. This will reduce the sensible heat and latent heat losses almost to zero. The amount can be controlled even more effectively by keeping the speed of ceramic cylinder and the flow rate of the exhaust (and fuel flow rate) at their optimum fixed points and by varying the hot air flow rate. Higher rate of air flow removes more heat per rotation, provides more cool ends for the condensation, and transports more moisture.

In this invention, the levels of CO and unburned fuel are negligible. The level of NOx can be reduced easily by recirculating a part of the exhaust gas to the combustion air. This is a well known in auto emission control as EGR. This drops the hot end temperature of the ceramic and the exit hot air temperature but not the thermal efficiency. The axial conduction of heat through the ceramic walls flattens the temperature gradient of the middle section. This undesirable entropic effect can be minimized by reducing the wall thickness. More uniform radial ceramic temperature minimizes undue internal thermal stress. The positive pressure of the air side and the slight vacuum of exhaust/burner side ensure a complete venting of the combustion products.

In the counter-current exchanges of heat and mass from the exhaust gas to the ceramic and in turn to the hot air, the hot air temperature can reach over the adiabatic flame temperature of the fuel, if a large part of combustion takes place in the pre-heated ceramic element. This temperature is limited only by the availability of high temperature ceramics and opens up many high temperature processes where an oxygen enriched flame or electrically augmented flame are used at present. Also the hot air stream can be divided into more than one pie shaped segments for varied temperature uses. For simple space heating, the very hot air from the ceramic should be mixed with a cool bypass air stream from a common air blower to a safe temperature before discharging into a room. An automatic damper which is sensitive to the humidity of the bypass flow can control the hot air flow through the ceramic and the amount of condensed moisture for the humidification. Also the damper is used to prevent the either breakthroughs.

This invention can be used in many other industrial applications for capacitive storage and transfer of both heat and moisture for peak shaving. In these applications where the ceramic element becomes too large to rotate, one can use one or more stationary elements by periodically reversing the flow direction rather than rotating the element in and out of the functionally partitioned spaces. Also a simple packed bed of ceramic particles can replace the ceramic element for a huge cost saving, as a cross flow does not affect the transfer of heat or mass.

BRIEF DESCRIPTION OF THE DRAWINGS

These and other details and advantages of my invention will be described in connection with the accompanying drawings which are furnished only by way of illustration and not in limitation of the invention and which drawings.

DESCRIPTION OF THE PREFERRED EMBODIMENT

Figure 1:
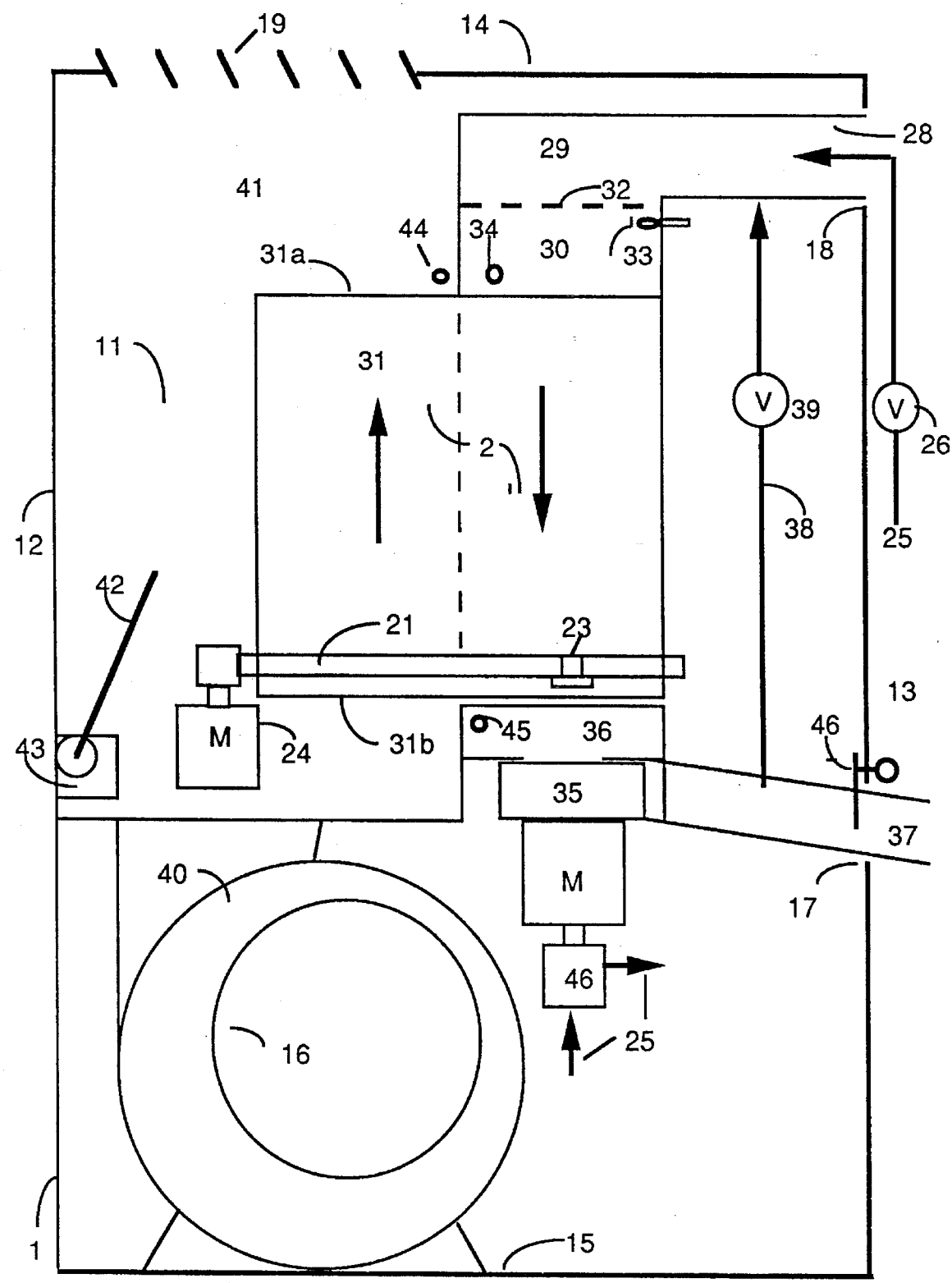
FIG. 1 is a schematic representation of the components of this invention, For clarity, the detailed wiring, support structures and the controls which are common to all heaters are not shown.

In FIG. 1, an enclosure 1 surrounds whole system and provides an air passage 11 around a rotating cylindrical ceramic element 2. The enclosure 1 has a removable front panel 12, a three-sided main body 13, top cover 14 with a louverred hot air outlet 19, and a base plate 15. The main body 13 supports the entire components structurally and has a pair of round opening for air inlets 16 (only one is shown) on both sides, an opening 18 for combustion air inlet and another opening 17 for a vent on the back. The top cover 14 and the bottom plate 15 are welded to the the main body 13.

The rotating cylindrical ceramic element 2 is like a honeycomb and has many substantially identical parallel axial flow passages 31 with porous walls. A metal ring 21 which is attached around the element 2 and provides smooth surfaces for sealing and bearing. With two bearings 23 (only one is shown), a small gear motor 24 supports and rotates the ring 21 and the element 2. The ceramic element 2 is rotated at the speed of about one revolution per minute in clockwise direction (looking from the top) and carries the heat and the moisture from the exhaust to the hot air as sensible heat of the ceramic and the condensed water, respectively. The element 2 has volumetric heat transfer areas of about 1,000 square feet per cubic feet and void fraction of about 75 percent. For a heater with 30,000 BTU/hour rating, one needs a ceramic element which is six inches tall and eight inches in diameter. It weighs only five pounds. At the operating temperature above 2,000 degree F., the hot end of the ceramic element 2 does not need an oxidation catalyst like an automotive catalytic converter unless the start up emissions need to be reduced.

Gaseous fuel is introduced to inlet port 28 by a fuel line 25 which has solenoid shut-off valve 26. The fuel entering into the port 28 aspires and mixes with the air in a mixing chamber 29. The mixture enters into combustor 30 and is lighted by an igniter 33. A properly perforated gas distribution plate 32 prevents back firing and helps to maintain a uniform air/fuel ratio. Except the initial few seconds of a start-up, if the temperature sensor 34 fail to sense a pre-set high temperature, whole unit is shut off for safety.

The combusted hot exhaust gas is pulled from the combustion chamber 30 through the flow passages 31, from the hot end 31a to the cool end 31b in the back (or right) half of the ceramic unit 2 and a chamber 36 by an exhaust blower 35, which discharges most of the exhaust gas and excess condensed water via vent 37. The directions of gas flows in the passages are indicated by two arrows. A small portion of the exhaust gas is recycle to the air inlet port 28 via line 38. A valve 39 controls the amount of the exhaust gas recycled (EGR). A sliding gate valve 46 controls the exhaust flow.

A double ended blower 40 takes the ambient air through the two openings 16 (only one is shown) and push up through the flow passages 31 in the front (or right) half of the ceramic element 2 and the air passage 11 around the ceramic element 2. The heated air exiting from the ceramic element 2 and the by-pass air stream from the air passage 11 mix to a safe lower temperature in a plenum 41 and pass through the louvers 19 into the room. The by-pass air stream keeps the enclosure 1 cool. A pivoted damper 42 controls the amount of air pass through the ceramic element 2 and is in turn controlled by a humidity sensitive controller 43 automatically. Whenever more moisture is needed the damper 42 is lowered to increase the air flow through the ceramic. To detect the temperature breakthroughs, two temperature sensors, 44 for the hot air (at just before 12 O'clock looking from the top) and 45 for the exhaust gas (at just before 6 O'clock) are provided. When the temperature sensor 44 detects a temperature drop, the controller 43 raises the damper 42 to remove less heat per revolution. Similarly, when the temperature sensor 45 detects a temperature rise above a preset point, the damper 42 is lowered.

Figure 2:
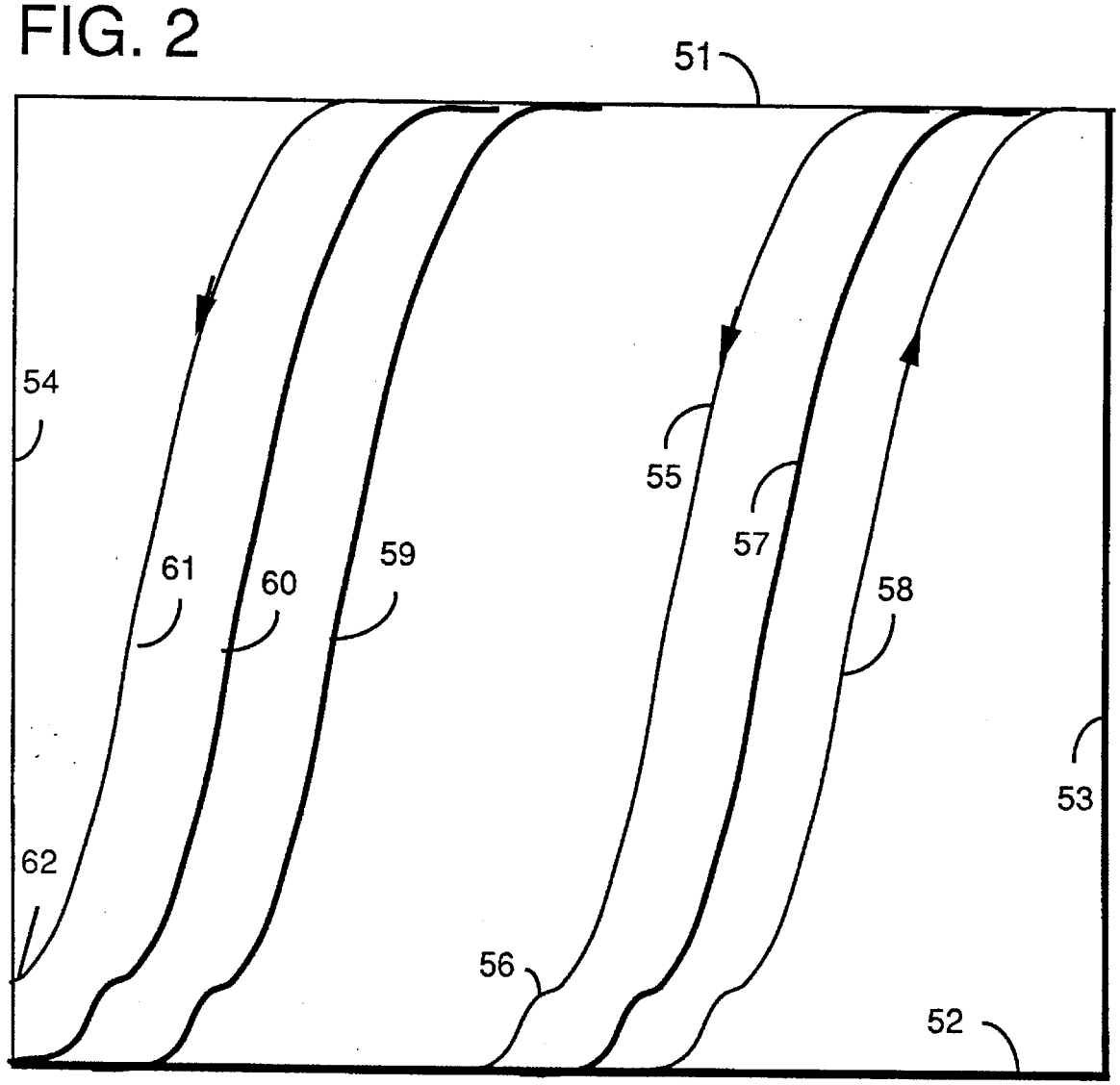
FIG. 2 is a graphic representation of the instantaneous axial temperature profiles at the various angles of the rotating cylindrical ceramic mass and heat storage element.

In FIG. 2, Y-axis represents temperature, namely, line 51 represents the temperature of the combusted gas entering the hot end 31a of the ceramic element and line 52 represents the room temperature. X-axis represents the distance along the ceramic flow passage, namely, line 53 represents the hot end 31a and line 54, the cool end 31b. Line 55 represents the temperature profile of the exhaust gas at the radial angle of 10 degree into the exhaust side. Line 57 represents the corresponding profile of the ceramic passage. The double bend 56 in line 55 indicates the moisture condensation and the additional heat transfer for the latent heat.

Although slight differences exist among the flat parts of the temperature profiles of the hot air, the exhaust and the ceramic at the both ends 51 and 52, they are negligible because of the very large transfer area. Line 59 represents a normal temperature profile of the passage at the radial angle of 180 degree. Line 61 represent the exhaust temperature profile at breakthrough and line 60 represent the corresponding passage temperature profile. At the exhaust breakthrough temperature 62, most of the moisture is vented.

Under a normal operating condition, the ceramic temperature profile shifts horizontally from a little right of 57, from the radial angle of zero rather than 10 degrees, to 59 as the exhaust gas transfer more heat and returns to the same starting position as the stored heat is transferred to the hot air. Thus, line 57 also represents the temperature profile of the passage at the radial angle of minus 10 degree as the heat storage and removal rates must be the same and the solid profile should be symmetrical to the either radial direction, plus or minus. Line 58 represents the temperature profile of the hot air at the radial angle of minus 10 degrees at the reversed flow direction. The integrated area bound by two profiles and the two extreme temperature lines represents the heat stored per rotation. The changes in the air flow rate with the damper 42 shifts line 59 and change the extent of the cool end and the amount of moisture available for the humidification.

When a liquid fuel is selected, minor modifications of the combustor and fuel supply are necessary. They are removal of the distribution plate 32, additions of a fuel pump 46 which is driven by the motor of the exhaust blower 35 and a fuel spray nozzle on the end of fuel line 25.

While the above description contains many specificities, these should not be construed as limitations of the scope of the invention, but rather as an exemplifications of one preferred embodiment thereof. Many other variations are possible. For example the orientation of the axis of rotation can be other than than vertical or reversed. Accordingly, the scope of the invention should be determined not by the embodiment illustrated, but by the appended claims and their legal equivalents.

I claim:

1. A vented forced hot air heater for indoor comfort comprising:

means for producing an exhaust of combustion products by burning a hydrogen containing fuel;

a transfer element having a large surface to mass ratio;

means for moving the combustion products through the transfer element and venting the remainder of said products;

means for pushing ambient air thought the transfer element to transfer sensible heat and moisture from said transfer element to said hot air;

means for rotating said transfer element continuously to transport said heat and moisture from said combustion products to said hot air stream;

said heater producing a hot inlet face, a cool outlet face and a distinct, stable axial temperature profile along the length of the transfer element;

means for producing a substantially uniform temperature across the inlet face of the element at a minimum temperature sufficiently high to incinerate incomplete combustion products from the exhaust including carbon monoxide and for cleaning said hot air by incinerating organic contaminants in said hot air.

2. The device of claim 1 wherein said means for cleaning comprises the hot end of said ceramic element.

3. The device of claim 1 wherein said means for burning including:

a partial recirculation of said combustion products to suppress the formation of NOx and additional thermal oxidation on the hot surface of said ceramic passages.

4. The device of claim 1 wherein said means for moving said combustion products comprises:

an exhaust blower;

a semicirclar burner outlet;

a matching semicirclar exhaust gas connecting chamber between said preset segment of said ceramic element and said exhaust blower;

a slide gate valve for adjusting the exhaust flow rate; and a slanted vent for draining the excess condensed water.

5. The device of claim 1 wherein said means for pushing comprises:

a double intake blower;

a by-pass air flow damper responsive to the humidity of said air; and an enclosure which provides a by-pass air passage around said element.

6. The device of claim 1 wherein said means for rotating comprises:

a pair of rollers;

a ring around said ceramic element; and a motor.

7. A vented forced hot air heater for indoor comfort comprising;

means for burning a hydrogen containing fuel and producing an exhaust of combustion products;

a cylindrical ceramic heat and mass storage and transport element having multiple substantially parallel axial flow passages with porous walls and a large surface to mass ratio;

means for moving the combustion products through a preset radial portion of said flow passages to transfer the heat and moisture form said products to the ceramic element and venting the remainder of said products;

means for controllably pushing the ambient air thought the remainder of said preset segments of said ceramic element in the opposite direction to transfer said sensible heat and moisture from said ceramic element to said hot air;

means for rotating said ceramic element continuously to transport said heat and moisture from said combustion products to said hot air stream;

said heater producing a hot inlet face, a cool outlet face and a distinct, stable axial temperature profile along the length of the cylindrical element;

means for producing a substantially uniform temperature across the inlet face of the cylindrical element at a minimum temperature sufficiently high to incinerate incomplete combustion products from the exhaust including carbon monoxide and serving to clean said hot air by incinerating organic contaminants in said hot air.

* * * * *